United States Patent [19]

Furukawa et al.

[11] Patent Number: 5,728,903
[45] Date of Patent: Mar. 17, 1998

[54] METHOD FOR PRODUCING FLOURINE-CONTAINING SILICONE COMPOUND

[75] Inventors: Yutaka Furukawa; Mami Kotera; Seisaku Kumai; Kazuya Oharu; Toshihiko Toma, all of Yokohama, Japan

[73] Assignee: Asahi Glass Company Ltd., Tokyo, Japan

[21] Appl. No.: 779,370

[22] Filed: Jan. 6, 1997

Related U.S. Application Data

[62] Division of Ser. No. 547,923, Oct. 25, 1995, Pat. No. 5,663,399.

[30] Foreign Application Priority Data

Oct. 28, 1994 [JP] Japan ................... 6-265334
Sep. 29, 1995 [JP] Japan ................... 7-254028
Sep. 29, 1995 [JP] Japan ................... 7-254032

[51] Int. Cl.$^6$ ................................... C07C 17/15
[52] U.S. Cl. ................ 570/155; 570/153; 570/156; 570/158
[58] Field of Search ..................... 570/155, 152, 570/158, 153

[56] References Cited

U.S. PATENT DOCUMENTS

| | | | |
|---|---|---|---|
| 3,621,067 | 11/1971 | Hamersma | 570/158 X |
| 5,180,860 | 1/1993 | Fernandez et al. | 570/155 X |
| 5,233,071 | 8/1993 | Wilczek. | |
| 5,321,108 | 6/1994 | Kunzler et al. | |
| 5,463,009 | 10/1995 | Okada et al. | |
| 5,473,038 | 12/1995 | O'Lenick, Jr. | |
| 5,523,497 | 6/1996 | Lui et al. | 570/155 |
| 5,536,890 | 7/1996 | Bielefeldt et al. | 570/153 X |

FOREIGN PATENT DOCUMENTS

| | | |
|---|---|---|
| 0 657 486 | 6/1995 | European Pat. Off. |
| 7-53719 | 2/1995 | Japan. |

*Primary Examiner*—Paul F. Shaver
*Attorney, Agent, or Firm*—Oblon, Spivak, McClelland, Maier & Neustadt, P.C.

[57] ABSTRACT

A method for producing a fluorine-containing silicone compound, which comprises subjecting a compound of the following formula (I) and a hydrosilicone compound having at least one hydrogen atom bonded to a silicon atom to hydrosilylation to obtain a fluorine-containing silicone compound having a $R^f$—Q—$CR^1R^2CR^3HCR^4R^5$— group bonded to the silicon atom:

$$R^f\text{—Q—}CR^1R^2CR^3=CR^4R^5 \qquad (I)$$

wherein $R^f$ is a monovalent fluorine-containing organic group, Q is a single bond or a bivalent organic group containing no fluorine atom, and each of $R^1$ to $R^5$ which are independent of one another, is a hydrogen atom or a monovalent organic group.

20 Claims, No Drawings

METHOD FOR PRODUCING FLOURINE-CONTAINING SILICONE COMPOUND

This is a division of application Ser. No. 08/547,923 filed on Oct. 25, 1995, now U.S. Pat. No. 5,663,399.

The present invention relates to a method for producing a fluorine-containing silicone compound from a compound of the formula (I) containing a fluorine-containing organic group and an unsaturated group. The fluorine-containing silicone compound is a useful compound as industrial materials or their starting materials, particularly as various industrial materials having excellent water repellent property, oil repellent property, stain proofing property or other properties, or their starting materials.

Heretofore, the following methods are known as a method for producing a fluorine-containing compound.

(1) A method which comprises ring opening-polymerizing a cyclic siloxane having a fluorine-containing group (such as $[R^fC_2H_4(CH_3)SiO]_3$ wherein $R^f$ refers to a polyfluoroalkyl group hereinafter) in the presence of an acid or an alkali.

(2) A method which comprises co-hydrolyzing chlorosilanes having a fluorine-containing group such as $R^fC_2H_4(CH_3)SiCl_2$, $R^fC_2H_4SiCl_3$ or the like obtained by reacting $R^fCH=CH_2$ with $H(CH_3)SiCl_2$, $HSiCl_3$ or the like, in the presence of dichlorosilanes having no fluorine-containing group.

The method (1) has many steps, and the reaction operation is complicated. Particularly, the synthesis of a cyclic siloxane is conducted by a reaction referred to as a "cracking", but requires a large amount of energy. Also, the method (1) has a problem that a compound having a $R^f$ group of a large number of carbons can not be synthesized since its boiling point is too high.

Also, the method (2) has a problem that the hydrolysis of chlorosilanes produces a large amount of a mixture of cyclic oligomers expressed by the formula $[R^fC_2H_4(CH_3)SiO]_x$ wherein x is 4 or more, and the yield of an aimed high molecular fluorine-containing silicone compound is low. Particularly, the yield becomes lower when the carbon number of $R^f$ is large.

There are known the following methods as a method for producing the compound (I) which is a starting material used in the present invention.

(3) A method which comprises reacting $R^fI$ with Zn to form $R^fZnI$ and then reacting the product thus formed with $CH_2=CHCH_2Z$ (Z=a halogen atom) in the presence of $Pd(PPh_3)_4$ while applying ultrasonic wave thereto (J. Am. Chem. Soc., 107, 5187 (1985)).

(4) A method which comprises reacting $R^fI$ with $Na_2S_2O_3$ to form $R^fSO_2Na$, and further reacting with $(NH_4)_2S_2O_8$ to generate a $R^f$ radical which is then reacted with $CH_2=CHCH_2Z$ (Z=a halogen atom) (J. Org. Chem. Soc., 56,2801, (1991)).

(5) A method which comprises reacting $R^fI$ with allylsilanes in the presence of a metal carbonyl complex (Japanese Examined Patent Publication No. 19367/1989).

However, these methods have such problems that the method (3) is not practical since an expensive palladium catalyst and ultrasonic wave are used, that the method (4) can not achieve a high yield, and that the method (5) can not be practiced on an industrial scale since expensive allylsilanes and poisonous carbonyl complex are used.

As a method for producing a compound having an allyl group as a terminal $R^f$ group among the compounds of the formula (I) used in the present invention, the following methods are known.

(6) A method which comprises subjecting $R^fI$ and allyl alcohol to addition reaction in the presence of a radical initiator and further reacting with a metal such as zinc.

(7) A method which comprises reacting $R^fI$ with an allylsilane in the presence of an iron or ruthenium catalyst (Tetrahedron Letters, 25, 307, 1984).

However, the method (6) can be hardly practiced on an industrial scale since $R^fI$ is hardly reacted with allyl alcohol and the treatment of zinc iodide is troublesome. Also, the method (7) can be hardly practiced on an industrial scale since the reaction time is too long and an expensive allylsilane is used.

Also, as a general method for synthesizing a terminal-unsaturated compound, the following method is known.

(8) A method which comprises subjecting a primary alcohol to dehydration reaction in the presence of a Lewis catalyst.

However, when $R^f$—Q—$CH_2CH_2CH_2OH$ was reacted in the presence of an alumina catalyst in a gas phase in accordance with the method (8), the initial reaction was favorably conducted, but the catalyst was remarkably degraded. Also, when dehydration reaction using sulfuric acid was conducted in a liquid phase in the method (8), there was a problem that an ether such as $(R^fCH_2CH_2CH_2)_2O$ and an impurity such as $R^fCH=CHCH_3$ hardly separable by distillation were produced in large amounts.

As mentioned above, there has not been known a method for producing a fluorine-containing silicone compound and its starting material cheaply and efficiently.

Thus, an object of the present invention is to solve the above-mentioned problems and to provide a novel method for producing a fluorine-containing silicone compound.

That is, the present invention provides a method for producing a fluorine-containing silicone compound, which comprises reacting a compound of the following formula (I) and a hydrosilicone compound having at least one hydrogen atom bonded to a silicon atom to obtain a fluorine-containing silicone compound having a $R^f$—Q—$CR^1R^2CR^3HCR^4R^5$— group bonded to the silicon atom:

$$R^f\text{—Q—}CR^1R^2CR^3=CR^4R^5 \quad (I)$$

wherein $R^f$ is a monovalent fluorine-containing organic group, Q is a single bond or a bivalent organic group, and each of $R^1$ to $R^5$ which are independent of one another, is a hydrogen atom or a monovalent organic group.

In the present invention, an "organic group" is preferably a hydrocarbon group. The "hydrocarbon group" is an organic group comprising a carbon atom and a hydrogen atom, but the hydrocarbon group used in the present invention may contain an oxygen atom or a sulfur atom. The hydrocarbon group may be either an aromatic hydrocarbon group or an aliphatic hydrocarbon group, but is preferably an aliphatic hydrocarbon group, more preferably an alkyl group, and most preferably an alkyl group having a carbon number of from 1 to 4. Hereinafter, a "lower alkyl group" refers to an alkyl group having a carbon number of from 1 to 4. The hydrocarbon group may have one or more ether type oxygen atom or thioether type sulfur atom introduced between carbon-carbon bonds. Also, in the aromatic hydrocarbon group, one or more hydrogen atom may be substituted with a hydrocarbon group such as an alkyl group.

$R^f$ of the compound (I) represents a monovalent fluorine-containing organic group. The "fluorine-containing organic group" used in the present invention means an organic group containing one or more fluorine atom. A preferable example of the fluorine-containing organic group include a "fluorine-containing hydrocarbon group" having a hydrocarbon group, one or more hydrogen atom of which is substituted with a fluorine atom.

Also, the fluorine-containing hydrocarbon group may be either a "fluorine-containing aromatic hydrocarbon group" having an aromatic hydrocarbon group, one or more hydrogen atom of which is substituted with a fluorine atom, or a "fluorine-containing aliphatic hydrocarbon group" having an aliphatic hydrocarbon group, one or more hydrogen atom of which is substituted with a fluorine atom, but a fluorine-containing aliphatic hydrocarbon group is preferable. The carbon number of the fluorine-containing aliphatic hydrocarbon group is from 1 to 18, preferably from 1 to 12. Also, one or more hydrogen atom of the fluorine-containing aromatic hydrocarbon group may be substituted with a hydrocarbon group such as an alkyl group. The carbon number of the fluorine-containing aromatic hydrocarbon group is preferably from 6 to 12, more preferably from 6 to 8.

Also, the fluorine-containing hydrocarbon group used in the present invention may have one or more ether type oxygen atom or thioether type sulfur atom introduced between carbon-carbon bonds of the above-mentioned fluorine-containing aliphatic hydrocarbon group.

When $R^f$ is a monovalent fluorine-containing aliphatic hydrocarbon group, it is preferably a "fluorine-containing alkyl group", one or more hydrogen atom of which is substituted with a fluorine atom, more preferably a "polyfluoroalkyl group", two or more hydrogen atoms of which are substituted with fluorine atoms.

The carbon number of the polyfluoroalkyl group is preferably from 1 to 18, more preferably from 1 to 12, most preferably from 6 to 12. Also, the polyfluoroalkyl group may have one or more ether type oxygen atom or thioether type sulfur atom introduced between carbon—carbon bonds of an alkyl group.

When $R^f$ is a polyfluoroalkyl group, proportion of fluorine atoms in the polyfluoroalkyl group, i.e. (fluorine atom number in the polyfluoroalkyl group)/(the total hydrogen atom number in an alkyl group having the same carbon number as the corresponding polyfluoroalkyl group)×100 (%), is preferably 60% or higher, more preferably 80% or higher, most preferably substantially 100% (perfluoroalkyl group). The carbon number of the perfluoroalkyl group is preferably from 1 to 18, more preferably from 1 to 12, most preferably from 6 to 12.

The polyfluoroalkyl group may have either a linear structure or a branched structure, but a linear structure is preferable. When the polyfluoroalkyl group has a branched structure, the branched portion is preferably a short chain having a carbon number of from 1 to 3.

Also, when $R^f$ is a monovalent fluorine-containing aromatic hydrocarbon group, one or more hydrogen atom of an aryl group such as a phenyl group, an aralkyl group such as benzyl group or these groups having a lower alkyl group substituted, is preferably substituted with a fluorine atom.

Examples of $R^f$ are illustrated hereinafter, but should not be limited thereto. The following examples include "structure-isomeric groups" having the same molecular formula but having different structures.

$C_2F_5$—, $C_3F_7$— (inducing both $CF_3(CF_2)_2$— and $(CF_3)_2$CF—), $C_4F_9$— (including $CF_3(CF_2)_3$—, $(CF_3)_2CFCF_2$—, $(CF_3)_3C$— and $CF_3CF_2CF(CF_3)$—), $C_5F_{11}$— (including structure-isomeric groups such as $CF_3(CF_2)_4$—, $(CF_3)_2CF(CF_2)_2$—, $(CF_3)_3CCF_2$— and $CF_3CF_2CF(CF_3)CF_2$—), $C_6F_{13}$— (including structure-isomeric groups such as $CF_3(CF_2)_2C(CF_3)_2$—), $C_8F_{17}$—, $C_{10}F_{21}$—, $C_{12}F_{25}$—, $C_{15}F_{31}$—, $HC_tF_{2t}$— (t=an integer of from 1 to 18), $(CF_3)_2$ CFC$_sF_{2s}$— (s=an integer of from 1 to 15), $CF_3(CF_2)_4OCF(CF_3)$—, $F[CF(CF_3)CF_2O]_sCF(CF_3)CF_2CF_2$—, $F[CF(CF_3)CF_2O]_tCF(CF_3)$—, $F[CF(CF_3)CF_2O]_uCF_2CF_2$—, $F(CF_2CF_2CF_2O)_vCF_2CF_2$—, $F(CF_2CF_2O)_wCF_2CF_2$—, $C_6F_5$—, $C_6F_5CF$=CF— (s, t=an integer of from 1 to 10, u=an integer of from 1 to 11, and w=an integer of from 1 to 11), and the like.

Also, in the compound (I), Q is a single bond or a bivalent organic group, preferably a single bond. When Q is a single bond, it means that $R^f$ is directly bonded with $CR^1R^2$, and means the same in other compounds.

When Q is a bivalent organic group, Q does not contain a fluorine atom. Also, Q is preferably a $C_1$-$C_8$ bivalent hydrocarbon group or a bivalent hydrocarbon group containing an atom inert in the reaction of the present invention. Further, Q is preferably a $C_1$-$C_8$ alkylene group, more preferably a $C_1$-$C_5$ alkylene group. Also, the alkylene group may be either a linear alkylene group or an alkylene group having a branched portion, but a linear alkylene group is preferable, and in the case of an alkylene group having a branched portion, the branched portion is preferably a short chain having a carbon number of from 1 to 3. Also, when Q is a bivalent hydrocarbon group containing an inert atom, preferable examples include a bivalent hydrocarbon group containing an ether type oxygen atom or a thioether type sulfur atom such as —(CH$_2$)$_2$O(CH$_2$)$_3$—, —CH$_2$O(CH$_2$)$_3$—, —(CH$_2$)$_2$S(CH$_2$)$_3$—, and the like.

This is also the same with regard to other compounds.

Also, in the compound (I), each of $R^1$ to $R^5$ is independently a hydrogen atom or a monovalent organic group, but any of $R^1$ to $R^5$ is preferably a hydrogen atom and more preferably all of $R^1$ to $R^5$ are hydrogen atoms. When any of $R^1$ to $R^5$ is a monovalent organic group, a preferable one is a hydrocarbon group, particularly a methyl group or an ethyl group.

Thus, the compound (I) is preferably a compound wherein $R^f$ is a perfluoroalkyl group, Q is a single bond and all of $R^1$ to $R^5$ are hydrogen atoms. Examples of the compound (I) are illustrated hereinafter, but should not be limited thereto.

$F(CF_2)_5CH_2CH$=$CH_2$,
$F(CF_2)_7CH_2CH$=$CH_2$,
$F(CF_2)_8CH_2CH$=$CH_2$,
$F(CF_2)_9CH_2CH$=$CH_2$,
$F(CF_2)_{12}CH_2CH$=$CH_2$,
$(CF_3)_2CF(CF_2)_2CH_2CH$=$CH_2$,
$(CF_3)_2CF(CF_2)_3CH_2CH$=$CH_2$,
$(CF_3)_2CF(CF_2)_4CH_2CH$=$CH_2$,
$F(CF_2)_5CH_2C(CH_3)$=$CH_2$,
$F(CF_2)_8CH_2C(CH_3)$=$CH_2$,
$F(CF_2)_5CH_2CH$=$CHCH_3$,
$F(CF_2)_8CH_2CH$=$CHCH_3$,
$F(CF_2)_8CH_2C(CH_3)$=$CHCH_3$,
$F(CF_2)_8CH_2C(CH_3)$=$C(CH_3)_2$,
$F(CF_2)_5CH_2CH_2CH$=$CH_2$,
$F(CF_2)_5(CH_2)_2O(CH_2)_3CH_2CH$=$CH_2$,
$F(CF_2)_5(CH_2)_2S(CH_2)_3CH_2CH$=$CH_2$,
$F[CF(CF_3)CF_2O]_uCF_2CF_2CH_2CH$=$CH_2$
(u=an integer of from 2 to 6)

A compound (I) can be synthesized in accordance with the following Method (A). Also, a compound (I) wherein all of $R^1$ to $R^5$ are hydrogen atoms can be synthesized also in accordance with the following Method (B).

Method (A) comprises reacting a compound (IA) with a compound (2A) to obtain a compound (3A) and eliminating XY from the compound (3A), as illustrated in the following reaction formula.

$$R^f-Q-X \quad (1A)$$
$$+$$
$$CR^1R^2=CR^3CR^4R^5Y \quad (2A)$$
$$\downarrow$$
$$R^f-Q-CR^1R^2CR^3XCR^4R^5Y \quad (3A)$$
$$\downarrow$$
$$R^f-Q-CR^1R^2CR^3=CR^4R^5 \quad (I)$$

wherein $R^f$, Q and $R^1$ to $R^5$ in the compounds (1A), (2A) and (3A) are as defined above, and X is an iodine atom, a bromine atom or a chlorine atom and Y is a monovalent group to be eliminated.

X of the compound (1A) is an iodine atom, a bromine atom or a chlorine atom, and an iodine atom is preferable since its activity to a radical initiator is highest.

Examples of the compound (1A) are illustrated hereinafter, but should not be limited thereto.
$F(CF_2)_5I$,
$F(CF_2)_7I$,
$F(CF_2)_8I$,
$F(CF_2)_9I$,
$F(CF_2)_{10}I$,
$F(CF_2)_{12}I$,
$F(CF_2)_{14}I$,
$F(CF_2)_6CH_2I$,
$F(CF_2)_8CH_2I$,
$F(CF_2)_{10}CH_2I$,
$F(CF_2)_6CH_2CH_2I$,
$F(CF_2)_8CH_2CH_2I$,
$F(CF_2)_5Br$,
$F(CF_2)_7Br$,
$F(CF_2)_8Br$,
$F(CF_2)_{10}Br$,
$F(CF_2)_6CH_2Br$,
$F(CF_2)_6Cl$,
$F(CF_2)_8Cl$,
$F[CF(CF_3) CF_2O]_uCF_2CF_2I$
(u=an integer of from 2 to 6)

A compound (1A) is reacted with a compound (2A). A compound (1A) to be reacted may be one or a mixture of two or more. When the compound (1A) is a mixture of two or more, there may be present two or more polyfluoroalkyl groups respectively having different carbon numbers. In the compound (2A), any of $R^1$ to $R^5$ is preferably a hydrogen atom, and particularly, all of $R^1$ to $R^5$ are preferably hydrogen atoms. When any of $R^1$ to $R^5$ is a monovalent organic group, a hydrocarbon group is preferable. When any of $R^1$ to $R^5$ is a sterically bulky organic group, the reactivity of the compound (2A) is lowered, and therefore, a sterically small organic group such as a methyl group or an ethyl group is preferable.

In the compound (2A), Y is a monovalent group to be eliminated, preferable examples of which include a halogen atom, $-OCOR^6$, $-OR^7$ or $-OH$, and more preferable examples of which include $-OCOR^6$, $-OR^7$ or $-OH$. Each of $R^6$ and $R^7$ is respectively a monovalent organic group. Preferable examples of the monovalent organic group include a hydrocarbon group, particularly a lower alkyl group, more particularly a methyl group or an ethyl group. Also, when Y is a halogen atom, its example include a chlorine atom, a bromine atom, a fluorine atom or an iodine atom, but the halogen atom has a fear of causing a side-reaction.

Examples of the compound (2A) are illustrated hereafter, but should not be limited thereto.

$CH_2=CHCH_2OCOCH_3$, $CH_2=CHCH_2OCOC_2H_5$, $CH_2=CHCH_2OCH_3$, $CH_2=CHCH_2OC_2H_5$, $CH_2=CHCH_2OH$, $CH_2=C(CH_3)CH_2OCOCH_3$, $CH_2=C(CH_3)CH_2OCOC_2H_5$, $CH_2=C(CH_3)CH_2OCH_3$, $CH_2=C(CH_3) CH_2OH$, $CH(CH_3)=CHCH_2OCOCH_3$, $CH(CH_3)=C(CH_3)CH_2OCOCH_3$, and the like.

In the reaction of a compound (1A) and a compound (2A), the compound (2A) is reacted in an amount of from 1 to 2 mols, preferably 1 to 1.5 mols, per mol of the compound (1A). The reaction may be conducted in the presence of a solvent. Preferable examples of the solvent include ester type solvents such as ethyl acetate or butyl acetate. The solvent is used in an amount of from 0.5 to 2 parts by weight per part by weight of the compound (1A).

Also, the reaction of the compound (1A) and the compound (2A) is conducted preferably in the presence of a radical generated from the compound (1A). In order to have the radical generated from the compound (1A), it is preferable to make a well known radical initiator be present in the reaction system. A preferable example of the radical initiator in the present invention includes an azo type radical initiator, particularly azobisisobutyronitrile. Also, an electron transfer type initiator such as Raney nickel can be used as a radical initiator. The radical initiator is used in an amount of from 0.05 to 10 parts by weight, preferably from 0.1 to 5 parts by weight per 100 parts by weight of the compound (1A).

A reaction temperature of the reaction of the compound (1A) and the compound (2A) is not specially limited. However, when a radical initiator is used, it is usually preferable to control the reaction temperature to a temperature in the vicinity of 10 hour half-life of a radical initiator depending on the type of the radical initiator. For example, when azobisisobutyronitrile is used, the reaction temperature is preferably around 60 to 90° C. Also, a reaction time is usually from 0.5 to 30 hours, preferably from 3 to 25 hours. A reaction pressure is not specially limited.

The reaction of the compound (1A) and the compound (2A) produces a compound (3A) of $R^f-Q-CR^1R^2CR^3=CR^4R^5Y$. Thereafter, XY is eliminated from the compound (3A) to produce a compound (I) of $R^f-Q-CR^1R^2CR^3=CR^4R^5$.

The above elimination reaction of XY is conducted preferably by heating in the presence of zinc. When zinc is present, X and Y are considered to be eliminated in the form of ZnXY. Zinc is used preferably in an amount of from 1 to 2 mols, more preferably from 1.1 to 1.5 mols per mol of the compound (3A).

A reaction time and a reaction temperature in the reaction to eliminate XY from the compound (3A) may optionally be varied depending on the type of Y. However, the reaction time is usually from 0.5 to 10 hours, and the reaction temperature is usually from 0 to 100° C. For example, when Y is $-OCOCH_3$, the reaction proceeds for 3 to 5 hours in the vicinity of room temperature. Also, when Y is $-OH$, the reaction proceeds for 2 to 4 hours in the vicinity of from 50 to 75° C. A reaction pressure is not specially limited.

Also, when XY is eliminated in the presence of zinc, a solvent may not be used, but it is preferable to use a solvent. Preferable examples of the solvent include alcohols, and methanol or ethanol is particularly preferred since it accelerates the procedure of the reaction. The solvent is used preferably in an amount of from 0.5 to 2 parts by weight per part by weight of the compound (3A).

Hereinafter, a method for synthesizing a compound of the formula (I) wherein all of $R^1$ to $R^5$ are hydrogen atoms (hereinafter referred as "compound (II)") in accordance with Method (B) is explained below.

Method (B) comprises reacting a compound (1B) with at least one compound selected from the group consisting of a compound (2B), a compound (3B), diphosphorus pentaoxide, metaphosphoric acid, pyrophosphoric acid and polyphosphoric acid, and further subjecting to pyrolysis to obtain a compound (IB).

In the above compounds (1B) to (3B) and compound (II), $R^f$ and Q are as defined above, and $R^{1B}$ and $X^{1B}$ to $X^{4B}$ are illustrated below.

$R^{1B}$ is a hydrogen atom or a $C_1$–$C_4$ alkyl group.

$X^{1B}$ is a halogen atom, —$OR^{6B}$ or —$OCOR^{7B}$ (wherein $R^{6B}$ is a hydrogen atom or a $C_1$–$C_4$ alkyl group and $R^{7B}$ is a $C_1$–$C_4$ alkyl group).

$X^{2B}$, $X^{3B}$ and $X^{4B}$ respectively may be same or different, and are a halogen atom or —$OR^{8B}$ (wherein $R^{8B}$ is a hydrogen atom or a $C_1$–$C_4$ alkyl group).

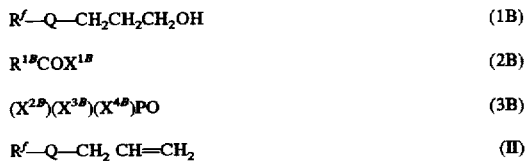

$$R^f\text{—}Q\text{—}CH_2CH_2CH_2OH \quad (1B)$$

$$R^{1B}COX^{1B} \quad (2B)$$

$$(X^{2B})(X^{3B})(X^{4B})PO \quad (3B)$$

$$R^f\text{—}Q\text{—}CH_2\,CH\text{=}CH_2 \quad (II)$$

Compound (1) is preferably a compound wherein $R^f$ is a $C_1$–$C_{20}$ polyfluoroalkyl group and Q is a single bond, i.e. a compound of the following formula (1B-2) wherein $R^{fB}$ is a $C_1$–$C_{20}$ polyfluoroalkyl group, particularly a perfluoroalkyl group.

$$R^{fB}\text{—}CH_2CH_2CH_2OH \quad (1B\text{-}2)$$

Examples of a fluorine-containing hydroxy compound of the formula (1B-2) are illustrated below.

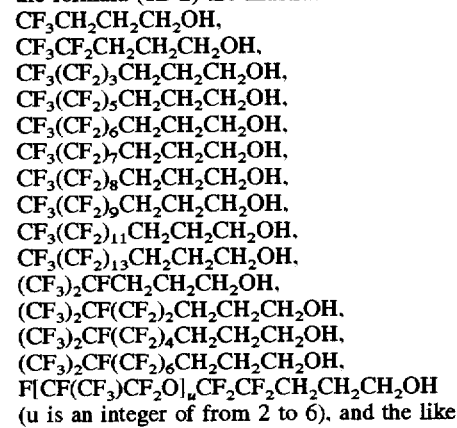

$CF_3CH_2CH_2CH_2OH$,
$CF_3CF_2CH_2CH_2CH_2OH$,
$CF_3(CF_2)_3CH_2CH_2CH_2OH$,
$CF_3(CF_2)_5CH_2CH_2CH_2OH$,
$CF_3(CF_2)_6CH_2CH_2CH_2OH$,
$CF_3(CF_2)_7CH_2CH_2CH_2OH$,
$CF_3(CF_2)_8CH_2CH_2CH_2OH$,
$CF_3(CF_2)_9CH_2CH_2CH_2OH$,
$CF_3(CF_2)_{11}CH_2CH_2CH_2OH$,
$CF_3(CF_2)_{13}CH_2CH_2CH_2OH$,
$(CF_3)_2CFCH_2CH_2CH_2OH$,
$(CF_3)_2CF(CF_2)_2CH_2CH_2CH_2OH$,
$(CF_3)_2CF(CF_2)_4CH_2CH_2CH_2OH$,
$(CF_3)_2CF(CF_2)_6CH_2CH_2CH_2OH$,
$F[CF(CF_3)CF_2O]_uCF_2CF_2CH_2CH_2CH_2OH$ (u is an integer of from 2 to 6), and the like.

Compound (1B) is an easily and cheaply available compound. Compound (1B) may be one or a mixture of two or more. When a mixture of two or more is employed, two or more polyfluoroalkyl groups having different carbon numbers may be present.

In the present invention, the above compound (1B) is reacted with a compound (2B) or a specific phosphoric acid compound.

In the compound (2B), $R^{1B}$ is a hydrogen atom or a $C_1$–$C_4$ alkyl group, and a $C1$–$C_4$ alkyl group, particularly a methyl group is preferable. $X^{1B}$ is a halogen atom, —$OR^{6B}$ or —$OCOR^{7B}$ (wherein $R^{6B}$ is a hydrogen atom or a $C_1$–$C_4$ alkyl group and $R^{7B}$ is a $C_1$–$C_4$ alkyl group). When $X^{1B}$ is a halogen atom, its example includes a chlorine atom, a bromine atom, a fluorine atom and an iodine atom.

Examples of the compound (2B) include formic acid, acetic acid, methyl acetate, propionic acid, acetic acid chloride, acetic anhydride, and the like, and among them, acetic acid, acetic acid chloride and acetic anhydride are preferable. One or two or more compound (2B) may be used, but one compound (2B) is usually used.

Compound (2B) is used in an amount of from 1 to 3 mols, preferably from 1.0 to 1.5 mols, per mol of a compound (1B).

The reaction of a compound (1B) and a compound (2B) may be conducted in the presence of an acid catalyst. The acid catalyst is not specially limited, and its example include sulfuric acid, paratoluene sulfonic acid and the like. When the acid catalyst is present, it is used in an amount of from 0.1 to 10 parts by weight per 100 parts by weight of a compound (2B).

Reaction conditions of a compound (1B) and a compound (2B) may optionally be varied depending on the type of a starting compound or an aimed yield. Usually a reaction temperature is from 0° to 200° C., more preferably from 50 to 150° C., and a reaction pressure is preferably normal pressure. A reaction time is preferably from 0.1 to 10 hours. Also, when $X^{1B}$ of a compound (2B) is —OH, it is preferable to proceed the reaction while removing water.

The reaction of a compound (1B) and a compound (2B) generally produces a compound of the following formula (5B) wherein $R^f$, Q and $R^{1B}$ are as defined above.

$$R^f\text{—}Q\text{—}CH_2CH_2CH_2OCOR^{1B} \quad (5B)$$

The reaction product including a compound (5B) may be subjected to pyrolysis after purification or may be subjected to pyrolysis without purification, and this is selected depending on various conditions such as an aimed use or a purity.

The pyrolysis reaction may be either gas phase reaction or liquid phase reaction, but gas phase reaction is preferable in view of various factors including a pyrolysis temperature and a boiling point of a reaction product.

When gas phase reaction is conducted, a reaction apparatus is not specially limited and an ordinary gas phase reaction reactor is appropriately used. Reaction temperature is usually from 300° to 600° C., preferably 450° to 550° C. The pyrolysis reaction is an endothermic reaction, and accordingly conversion becomes low when the reaction temperature becomes low. Reaction time is usually from 0.1 to 300 seconds, particularly from 2 to 120 seconds. If the reaction time is too short, conversion is liable to become low. On the other hand, if the reaction time is too long, there is a fear that a byproduct is formed. Reaction pressure may be normal pressure, a reduced pressure or a pressurized pressure, and is usually from 0.5 to 5 atms.

Also, in the present invention, the above compound (1B) may be reacted with at least one specific phosphoric acid compound selected from the group consisting of a compound (3B), diphosphorus pentaoxide, metaphosphoric acid, pyrophosphoric acid and polyphosphoric acid, and is then subjected to pyrolysis to obtain an aimed compound. Hereinafter, "compound (3B), diphosphorus pentaoxide, metaphosphoric acid, pyrophosphoric acid or polyphosphoric acid" may sometimes be referred to as "phosphoric acid compound".

In the compound (3B), $X^{2B}$, $X^{3B}$ and $X^{4B}$ respectively may be the same or different, and are a halogen atom or —$OR^{8B}$ (wherein $R^{8B}$ is a hydrogen atom or a $C_1$–$C_4$ alkyl group). Examples of the compound (3B) include phosphorus oxychloride, phosphorus oxybromide, trimethyl phosphate, triethyl phosphate, tributyl phosphate and the like, but should not be limited thereto. One or two or more phosphoric acid compound may be used.

The phosphoric acid compound is reacted with a compound (1B) in an amount of at least 0.3 mol, preferably from 0.33 to 20 mols, per mol of the compound (1B). Reaction conditions of a compound (1B) and the phosphoric acid compound may optically be varied depending on the type of a starting compound or an aimed yield. Usually a reaction temperature is from 0° to 200° C., preferably from 50° to 150° C. Reaction pressure is usually normal pressure. Reaction time is from 0.1 to 5 hours.

The reaction of a compound (1B) and the phosphoric acid compound is considered to produce a phosphoric acid ester. For example, when all of $X^{2B}$, $X^{3B}$ and $X^{4B}$ in the compound (3B) to be reacted are —$OR^{8B}$, a phosphoric acid ester of the following formula (6) is considered to be produced.

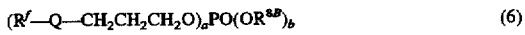

In the formula (6), $R^f$, Q and $R^{8B}$ are as defined above; and a is an integer of from 1 to 3 and b is an integer of from 0 to 2 and a+b=3. One type of a compound (6) may be produced, but usually two or more types of a compound (6) are considered to be produced.

A reaction product of the reaction of a compound (1B) with a compound (2B) or a phosphoric acid compound may be subjected to pyrolysis after purification or may be subjected to pyrolysis without purification, depending on various conditions such as an aimed use or a purity of the reaction product.

The pyrolysis reaction may be either gas phase reaction or liquid phase reaction, but liquid phase reaction is preferable when a boiling point of a reaction product and a pyrolysis reaction temperature taken into consideration. When the liquid phase reaction is conducted, a reaction apparatus may be a flow reactor or a batch reactor, and is not specially limited. Reaction temperature is from 200° to 400° C. preferably from 250° to 350° C. When the batch reactor is employed, the reaction is conducted preferably by withdrawing a reaction product by distillation or other means.

Also, when the pyrolysis reaction of the present invention is conducted in a gas phase, an inert gas may be present in any case of using a reaction product either by reaction with a compound (2B) or by reaction with a phosphoric acid compound. Examples of the inert gas include nitrogen or rare gases, but nitrogen or helium is preferable since it is easy to handle and easily available.

The amount of the inert gas is not specially limited, but if it is too large, a recovery is liable to become low. Thus, usually the inert gas is present preferably at a concentration of 50% by volume in a reaction product.

In the reaction of a compound (1B) with a compound (2B) or a phosphoric acid compound, a solvent may be present. A preferable example of the solvent is an inert solvent containing no active hydrogen, but it is desirable not to use a solvent since there is a problem of removing or treating the solvent.

The above pyrolysis reaction produces a compound (II) which is a compound of compound (I) wherein all of $R^1$ to $R^5$ are hydrogen atoms.

Compound (I) is useful as it is as a starting material for industrial materials. Since industrial materials synthesized from the compound (I) have a fluorine-containing organic group, they are expected to have water repellent and oil repellent properties. Thus, the compound (I) is useful as a starting material for providing industrial materials having the above-mentioned properties.

Examples of a starting material for industrial materials include oligomers obtained by polymerizing one or two or more compound (I) or by polymerizing a compound (I) with other polymerizable monomers. Since an electron-attractive $R^f$ group in the compound (I) of the present invention is not close to a polymerizable unsaturated part, the compound (I) of the present invention has a high reactivity in polymerization reaction and is easily polymerizable by a known method.

When the compound (I) is polymerized with other polymerizable monomers, the following polymerizable monomers can be used. Examples of the polymerizable monomers include acrylate, methacrylate (acrylate and methacrylate are simply referred to as "(meth)acrylate" hereinafter, and this is applied also to other compounds), ethylene di(meth) acrylate, cyclohexyl(meth)acrylate, (meth)acrylic acid alkyl ester, polyoxypropylenediol mono(meth)acrylate, polyoxypropylenediol di(meth)acrylate, vinyl chloride, vinyl acetate, vinyl fluoride, vinyl alkylketone, ethylene, styrene, α-methylstyrene, butadiene, isoprene, chloroprene, (meth) acrylonitrile, (meth)acrylamide, N-methylol (meth) acrylamide, diacetone(meth)acrylamide, glycidyl(meth) acrylate, hydroxyalkyl(meth)acrylate, 3-chloro-2-hydroxyl (meth)acrylate, aziridinyl(meth)acrylate, maleic acid, and the like.

In the present invention, a fluorine-containing silicone compound having a $R^f$—Q—$CR^1R^2CR^3HCR^4R^5$— group bonded to a silicon atom is obtained by reacting a compound (I) with a hydrosilicone compound having a hydrogen atom directly bonded to a silicon atom. In the above reaction, Q of the compound (I) is a single bond and any of $R^1$ to $R^5$ is a hydrogen atom. Particularly, a compound (II) wherein all of $R^1$ to $R^5$ are hydrogen atoms is preferable since its reactivity is high.

According to the above method, a compound (I) can be obtained at a high yield from an easily available cheap starting material. Also, the aimed fluorine-containing silicone compound can be efficiently synthesized by subjecting the compound (I) to the following reaction.

As a hydrosilicone compound having at least one hydrogen atom directly bonded to a silicon atom, a well known compound having at least one Si—H bond in a molecule of a silicone compound can be used. The hydrosilicone compound is preferably a silicone compound having hydrosiloxane units such as $R^aHSiO_{2/2}$ unit, $(R^b)_2HSiO_{1/2}$ unit and $HSiO_{3/2}$ unit wherein $R^a$ and $R^b$ are monovalent hydrocarbon groups (preferably a $C_1$–$C_3$ alkyl group, $C_6H_5$— or $C_6H_5CH_2CH_2$—, more preferably a methyl group).

Also, when the hydrosilicone compound has a siloxane unit other than the the above hydrosiloxane units, preferable other siloxane units include $(R^c)_3SiO_{1/2}$ unit, $(R^d)_2SiO_{2/2}$ unit, $R^eSiO_{3/2}$ unit and the like, wherein $R^c$ to $R^e$ are monovalent hydrocarbon groups, preferably a $C_1$–$C_3$ alkyl group, $C_6H_5$— or $C_6H_5CH_2CH_2$—, more preferably a methyl group).

The hydrosilicone compound may be any of cyclic, linear (straight chain-like or branched chain-like) and resin-like structures, but a linear compound is preferable and particularly a straight chain-like compound is more preferable.

The hydrosilicone compound of the present invention is preferably a hydrosilicone compound having the average compositional formula of the following formula (5) wherein a is 0<a<4, b is 0≦b<4, c is 0<c<4, 0<a+b+c<4, and $R^8$ is a monovalent organic group (preferably a monovalent hydrocarbon group, particularly a $C_1$–$C_3$ alkyl group, $C_6H_5$— or $C_6H_5CH_2CH_2$—, most preferably a methyl group).

Examples of the hydrosilicone compound having the average compositional formula (5) include a linear hydrosilicone compound (5A) or (5B), a branched hydrosilicone compound (5C) and the like, and a compound (5A) or (5B) is preferable.

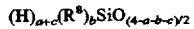

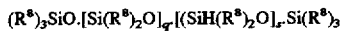  (5A)

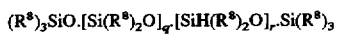  (5B)

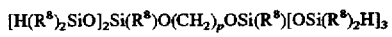  (5C)

In compounds (5A) and (5B), $R^8$ is the same as defined above, preferably a methyl group; and q is an integer of 0 or more, r is an integer of 1 or more and s is an integer of 2 or more. Also, siloxane units described in the above compounds (5A) and (5B) may be connected either in a block-like form or in a random-like form. This is applied also to other siloxane units.

In the reaction between a hydrosilicone compound and a compound (I)(hereinafter referred to as "hydrosilylation"), a fluorine-containing silicone compound having a $R^f$—Q—$CR^1R^2CR^3HCR^4R^5$— group directly bonded to a silicon atom is obtained by addition reaction caused to a hydrogen atom directly bonded to a silicon atom.

In the above hydrosilylation, it is important that a compound (I) is a compound having a connecting group (—Q—$CR^1R^2$—) between a $R^f$ group and an unsaturated group (—$CR^3$=$CR^4R^5$). If the compound (I) is a compound which does not have such a connecting group as mentioned above, e.g. $C_8F_{17}CH$=$CH_2$, addition reaction to the hydrosilicone compound hardly proceeds.

The above hydrosilylation is conducted preferably in the presence of a catalyst. A preferable example of the catalyst includes a catalyst containing a transition metal, particularly a catalyst containing platinum, rhodium or cobalt. Usually, a reaction temperature is preferably from 0° to 100° C., and a reaction time is from 0.5 to 10 hours. The catalyst is used preferably in an amount of from 1 to 100 ppm in an ordinary reaction system.

The hydrosilylation produces a fluorine-containing silicone compound having a $R^f$—Q—$CR^1R^2CR^3HCR^4R^5$— group bonded to a silicon atom. The silicone compound having a $R^f$—Q—$CR^1R^2CR^3HCR^4R^5$— group bonded to a silicon atom is referred to as "fluorine-containing silicone compound" hereinafter. The structure of the fluorine-containing silicone compound takes various forms depending on various conditions including the structure of a hydrosilicone compound, the proportion of compound (I) and reaction conditions.

For example, when an excess equivalent amount of a hydrosilicone compound is reacted with a compound (I) (hereinafter referred to as "Reaction condition 1"), a fluorine-containing silicone compound having at least one $R^f$—Q—$CR^1R^2CR^3HCR^4R^5$— group bonded to a silicon atom and at least one hydrogen atom bonded to a silicon atom is formed. A hydrosilicone compound used in the above reaction should have at least 2 hydrogen atoms bonded to a silicon atom. Under Reaction condition 1, the amount of compound (I) is more than 0 but less than 1 equivalent, preferably from 0.3 to 0.8 equivalent per equivalent of a hydrosilicone compound.

On the other hand, when an excess equivalent amount of compound (I) is reacted with a hydrosilicone compound (hereinafter referred to as "Reaction condition 2"), hydrosilylation sufficiently proceeds to produce a fluorine-containing silicone compound having a $R^f$—Q—$CR^1R^2CR^3HCR^4R^5$— group bonded to a silicon atom and containing substantially no hydrogen atom bonded to a silicon atom, i.e. a fluorine-containing silicone compound wherein substantially all of hydrogen atoms bonded to silicon atoms are substituted with $R^f$—Q—$CR^1R^2CR^3HCR^4R^5$— groups. A hydrosilicone compound used in the above reaction may have at least one hydrogen atom bonded to a silicon atom. Under Reaction condition 2, the amount of compound (I) is at least one equivalent, preferably from 1.1 to 2 equivalents, per equivalent of a hydrosilicone compound.

A fluorine-containing silicone compound formed under Reaction condition 1 is preferably a compound of the average compositional formula (6) wherein all of $R^1$ to $R^5$ are hydrogen atoms. The compound of the formula (6) may be either a straight chain-like compound or a branched chain-like compound, but a straight chain-like compound is preferable.

In the formula (6), $R^f$, Q and $R^8$ are as defined above; and 0<a<4, 0≦b<4, 0<c<4 and 0<a+b+c<4.

Also, when hydrosilylation is conducted under Reaction condition 1 by using the above straight chain-like hydrosilicone compound (5A) as a hydrosilicone compound and the above compound (II) which is a compound of the formula (I) wherein all of $R^1$ to $R^5$ are hydrogen atoms, a compound (6A) is obtained.

In the compound (6A), $R^f$, Q, $R^8$ and q are as defined above; and s is an integer of 2 or more, and f is an integer of 1 or more but is less than s (s>f). Compound (6B) corresponding to a compound (6A) wherein Q is a single bond is preferable.

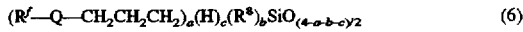  (6)

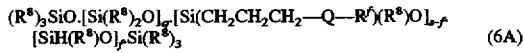  (6A)

  (6B)

A fluorine-containing silicone compound having at least one hydrogen atom bonded to a silicon atom and a $R^f$—Q—$CR^1R^2CR^3HCR^4R^5$— group bonded to a silicon atom, synthesized under Reaction condition 1, can be crosslinked in the presence of a crosslinking agent, and also can be converted to a fluorine-containing silicone compound having an unsaturated group and a $R^f$—Q—$CR^1R^2CR^3HCR^4R^5$— group by reacting with acetylene, butadiene or the like. For example, when a compound (6B) is reacted with acetylene, the following compound (7) is formed.

  (7)

wherein $R^f$, Q, $R^8$, g, s and f are as defined above.

On the other hand, a fluorine-containing silicone compound synthesized under Reaction condition 2 is preferably a compound of the average compositional formula (8). The compound of the formula (8) may be either a straight chain-like compound or a branched chain-like compound, but a straight chain-like compound is preferable.

In the formula (8), $R^f$, Q and $R^8$ are as defined above; and 0<a<4, 0≦b<4, 0<c<4 and 0<a+b+c<4. Also, when hydrosilylation is conducted under Reaction condition 2 by using the above compound (5B) as a hydrosilicone compound and the above compound (II), a compound (8A) is obtained.

In the compound (8A), $R^f$, Q and $R^8$ are as defined above; q is an integer of 0 or more and r is an integer of 1 or more. Compound (8B) corresponding to a compound (8A) wherein Q is a single bond is preferable.

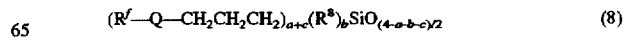  (8)

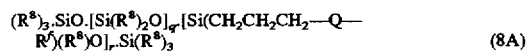  (8A)

$(R^8)_3.SiO.[Si(R^8)_2O]_q.[Si(CH_2CH_2CH_2R^f)(R^8)O]_r.Si(R^8)_3$ (8B)

In the compound (8B), $R^8$ is preferably a monovalent hydrocarbon group, more preferably a $C_1$–$C_3$ alkyl group, $C_6H_5$— or $C_6H_5CH_2CH_2$—, most preferably a methyl group.

A fluorine-containing silicone compound synthesized under Reaction condition 2 is useful as a functional oil. For example, this compound can be coated on a surface of a heat-fixing roll of a copying machine or printing machine to impart a stain proofing property to the fixing roll surface. This is an excellent method for preventing offset phenomena of a copying machine or printing machine.

When a compound (8A) or a compound (8B) is used as a functional oil, these compounds should preferably have a molecular weight of from $1\times10^3$ to $1\times10^6$, more preferably from $5\times10^3$ to $15\times10^3$. q and r values should be usually $5 \leq q+r \leq 1400$, preferably $20 \leq q+r \leq 400$. In order to efficiently achieve the functions of water repellent and oil repellent properties and stain proofing properties based on a fluorine atom, q and r values are selected preferably so as to control the fluorine atom content in the range of from 15 to 90% by weight, preferably from 15 to 70% by weight.

A silicone compound having an unsaturated group in a molecule (e.g. compound (7)) is usable as a crosslinking agent for a silicone compound having a hydrogen atom bonded to a silicon atom, or is crosslinkable with other compounds to obtain a silicone resin or a silicone rubber. The silicone resin and the silicone rubber are useful for electric uses including insulating varnish, wire enamel, glass cloth laminate and coil impregnating varnish, and electronic industrial uses including protective coating or potting resin for electronic circuits, surface treatment of semiconductors, clad material for glass fibers and release agent.

In addition to the above-mentioned uses, the silicone compound having a fluorine-containing organic group of the present invention is useful for various lubricating oils including refrigerator oil, vacuum pump oil or the like, various working oils including transmission oil, brake oil, coupling oil or the like, vibration-deadening oils for automobile or airplane instruments, pickup for player or the like, damping oils for dash pot, shock absorber or the like, lubricating agents, repellents and release agents for heat transfer recorded image-receiving material, magnetic recording medium, magnetic head, impregnated bearing or the like, roll compositions or their surface-coating agents for copying machines, printers or the like, blending agents for shampoo, rinse, or other various make up cosmetic materials, treating agents for various powders, water repellent-oil repellent agents, deep color-processing agents, lubrication-imparting agents for fabrics, insulating oils including transformer oils, condenser oils, cable oils or the like, various additives including leveling agents, anti-blocking agents, irregular color-preventing agents, orange peel-preventing agents or the like for polymer materials including plastics, paints or the like, plasticizers or modifiers for rubber or resins, anti-foaming agents, base oils for grease or compounds, foam stabilizers, blending oils for wax, toner treating agents, oil sealing agents, rust proofing agents, antistatic agents, anti-fogging agents, additives for pharmaceuticals, polishing materials, and the like.

EXAMPLES

Now, the present invention will be described in further detail with reference to Examples. However, it should be understood that the present invention is by no means restricted to such specific Examples.

The following Example 1A to Example 4A illustrate Preparation Examples of compounds (I) in accordance with Method (A). Example 5A to Example 6A illustrate Preparation Examples of fluorine-containing silicone compounds by using compounds (I) synthesized in accordance with Method (A), and Example 7A to Example 8A illustrate Reference Examples.

Also, Example 1B to Example 8B illustrate Preparation Examples of carboxylic acid esters in accordance with Method (B), Example 9B to Example 14B illustrate Preparation Examples of compounds (I) in accordance with Method (B), and Example 15B to Example 17B illustrate Preparation Examples of fluorine-containing silicone compounds by using compounds (I) synthesized in accordance with Method (B).

EXAMPLE 1A 100 g of $CF_3(CF_2)_7I$, 11.7 g of $CH_2$=$CHCH_2OH$ and 0.5 g of azoisobutyronitrile (AIBN) were charged into a 200 cc four-forked flask equipped with a stirrer and a thermometer, the content of which was fully replaced by nitrogen, and temperature was raised to 70° C. to initiate reaction. After 20 hours, disappearance of $CF_3(CF_2)_7I$ was recognized by gas chromatography, and production of $CF_3(CF_2)_7CH_2CHICH_2OH$ was recognized.

Thereafter, 100 g of methanol and 13.6 g of zinc were added to the reaction mixture, and reaction was conducted at 65° C. After 3 hours, $CF_3(CF_2)_7CH_2CHICH_2OH$ was disappeared, and production of $CF_3(CF_2)_7CH_2CH$=$CH_2$ was recognized. A solid content was removed from the reaction mixture by filtration, and 58.9 g (yield 70%) of $CF_3(CF_2)_7CH_2CH$=$CH_2$ was obtained by distillation. The spectrum analysis data of the compound thus obtained are as follows:

IR: 1655 cm$^{-1}$
$^1$HNMR σ(ppm): 5.2–6.1(m,3H), 2.5–3.2(td,2H).

EXAMPLE 2A

The same procedure as in Example 1A was repeated, except that 20.1 g of $CH_2$=$CHCH_2OCOCH_3$ was used in place of CH=$CHCH_2OH$, thereby obtaining 56.3 g (yield 80%) of $CF_3(CF_2)_7CH_2CH$=$CH_2$.

EXAMPLE 3A

The same procedure as in Example 1A was repeated, except that 100 g of $CF_3(CF_2)_5I$ was used in place of $CF_3(CF_2)_7I$, thereby obtaining 64.6 g (yield 80%) of $CF_3(CF_2)_5CH_2CH$=$CH_2$.

EXAMPLE 4A

The same procedure as in Example 1A was repeated, except that 100 g of a mixture of $CF_3(CF_2)_7I$, $CF_3(CF_2)_9I$ and $CF_3(CF_2)_{11}I$ (9:3:1 mol ratio) was used in place of $CF_3(CF_2)_7I$, thereby obtaining 60 g (yield 70%) of a mixture of $CF_3(CF_2)_7CH_2CH$=$CH_2$, $CF_3(CF_2)_9C_2CH$=$CH_2$ and $CF_3(CF_2)_{11}CH_2CH$=$CH_2$ (9:3:1 mol ratio).

EXAMPLE 5A 100 g of compound (9A) and 2 μl of a 1% isopropanol solution of chloroplatinic acid were charged into a 200 cc four-forked flask equipped with a stirrer and a thermometer. After raising a temperature to 80° C., 260 g of $CF_3(CF_2)_7CH_2CH$=$CH_2$ prepared in Example 1A was dropwise added thereto. As reaction proceeded, an internal temperature rise of about 10° C. was recognized. After 4 hours, disappearance of monomer was recognized, and the reaction was stopped. 0.5 g of activated carbon was added therein, and the reaction mixture was stirred at room temperature for 1 hour, followed by filtration to obtain a transparent oil. The product thus obtained was recognized by NMR and IR analysis to have a structure of the formula (10A), and its viscosity was 150 cp. IR:1255 cm$^{-1}$(Si—CH$_3$),1110-1000 cm$^{-1}$(Si—O), 1100-1340 cm$^{-1}$(C—F)

$^1$HNMR σ(ppm):0.4–0.7(m,Si—CH$_2$—C), 1.7-2.7(m, Si—C—CH$_2$CH$_2$—).

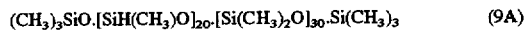
(CH$_3$)$_3$SiO.[SiH(CH$_3$)O]$_{20}$.[Si(CH$_3$)$_2$O]$_{30}$.Si(CH$_3$)$_3$ (9A)

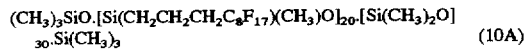
(CH$_3$)$_3$SiO.[Si(CH$_2$CH$_2$CH$_2$C$_8$F$_{17}$)(CH$_3$)O]$_{20}$.[Si(CH$_3$)$_2$O]$_{30}$.Si(CH$_3$)$_3$ (10A)

EXAMPLE 6A

Reaction was conducted under the same reaction conditions as in Example 5A, except that 193 g of CF$_3$(CF$_2$)$_7$CH$_2$CH=CH$_2$ and 100 g of compound (9A) of Example 5A were used. The reaction product thus obtained was recognized by NMR and IR analysis to have a structure of the formula (11A).

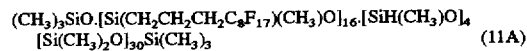
(CH$_3$)$_3$SiO.[Si(CH$_2$CH$_2$CH$_2$C$_8$F$_{17}$)(CH$_3$)O]$_{16}$.[SiH(CH$_3$)O]$_4$.[Si(CH$_3$)$_2$O]$_{30}$Si(CH$_3$)$_3$ (11A)

EXAMPLE 7A 100 g of compound (9A) of Example 5A and 2 μl of a 1% isopropanol solution of chloroplatinic acid were charged into a 200 cc four-forked flask equipped with a stirrer and a thermometer. After raising a temperature to 80° C., 128 g of CF$_3$(CF$_2$)$_7$CH$_2$CH=CH$_2$ prepared in Example 1A was dropwise added thereto. Thereafter, 1 g of acetylene was blown thereinto. As reaction proceeded, an internal temperature rise of about 10° C. was recognized. After 4 hours, disappearance of monomer was recognized, and the reaction was stopped. 0.5 g of activated carbon was added therein, and the reaction mixture was stirred at room temperature for 1 hour, followed by filtration to obtain a transparent oil. The product thus obtained was recognized by NMR and IR analysis to have a structure of the formula (12A), and its viscosity was 160 cp.

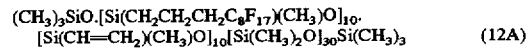
(CH$_3$)$_3$SiO.[Si(CH$_2$CH$_2$CH$_2$C$_8$F$_{17}$)(CH$_3$)O]$_{10}$.[Si(CH=CH$_2$)(CH$_3$)O]$_{10}$[Si(CH$_3$)$_2$O]$_{30}$Si(CH$_3$)$_3$ (12A)

EXAMPLE 8A

The same procedure as in Example 3A was repeated, except that CF$_3$(CF$_2$)$_7$CH=CH$_2$ was used in place of CF$_3$(CF$_2$)$_7$CH$_2$CH=CH$_2$, but reaction did not proceed at all and CF$_3$(CF$_2$)$_7$CH=CH$_2$ was recovered.

EXAMPLE 1B 1042 g (2.18 mols) of CF$_3$(CF$_2$)$_7$CH$_2$CH$_2$CH$_2$OH and 245 g (2.40 mols) of acetic anhydride were charged into a 1 l three-forked flask equipped with a thermometer and a reflux condenser, and the reactants were reacted at 100° C. for 5 hours and were then distilled, thereby obtaining 1094 g of CF$_3$(CF$_2$)$_7$CH$_2$CH$_2$CH$_2$OCOCH$_3$ (yield 96.5%, boiling point 107° C./6 mmHg).

EXAMPLE 2B 2300 g (4.81 mols) of CF$_3$(CF$_2$)$_7$CH$_2$CH$_2$CH$_2$OH, 360 g (6.0 mols) of acetic acid and 46 g (0.27 mol) of paratoluenesulfonic acid were charged into a 2 l three-forked flask equipped with a thermometer and a reflux condenser, and the reactants were reacted at 100° to 130° C. and the water generated was distilled off. Pressure in the reactor was gradually reduced finally to 80 mmHg, and the water generated was further distilled off. Thereafter, 2345 g (yield 93.8%) of CF$_3$(CF$_2$)$_7$CH$_2$CH$_2$CH$_2$OCOCH$_3$ was obtained by distillation.

EXAMPLE 3B

An Inconel 600-made reactor having an internal diameter of 1.27 cm and a length of 100 cm was heated to 500° C. by an electric heater. CF$_3$(CF$_2$)$_7$CH$_2$CH$_2$CH$_2$OCOCH$_3$ obtained by distillation in Example 1 was vaporized in a preheater heated to 300°C., and was charged into the reactor under normal pressure. The reaction temperature was 500° C., and the residence time in the reactor was 60 seconds. The reacted crude gas was cooled, and the recovered liquid was analyzed-by gas chromatography to recognize the production of CF$_3$(CF$_2$)$_7$CH$_2$CH=CH$_2$. The reaction conversion was 86.5% and the selectivity was 89.7%.

EXAMPLES 4B to 8B

The same procedure as in Example 3B was repeated, except that the reaction conditions were varied as shown in the following Table 1. The results are shown in Table 1.

TABLE 1

|  | Example 4B | Example 5B | Example 6B | Example 7B | Example 8B |
| --- | --- | --- | --- | --- | --- |
| Reaction Temp (°C.) | 500 | 500 | 400 | 450 | 480 |
| Residence time (sec) | 17 | 109 | 52 | 61 | 58 |
| Conversion (%) | 58.8 | 97.7 | 5.2 | 41.1 | 64.9 |
| Selectivity (%) | 92.7 | 82.0 | 99.2 | 94.5 | 92.2 |

EXAMPLE 9B

An Inconel 600-made U-letter type reactor having an internal diameter of 2.54 cm and a length of 160 cm was bathed in a salt bath furnace and the temperature was adjusted to 450° C. CF$_3$(CF$_2$)$_7$CH$_2$CH$_2$CH$_2$OCOCH$_3$ obtained by distillation in Example 2 was vaporized in a preheater heated to 300° C., and was introduced into the reactor under normal pressure. The reaction temperature was 500°C., and the residence time in the reactor was 65 seconds. The reacted crude gas was cooled, and the recovered liquid was analyzed by gas chromatography to recognize the production of CF$_3$(CF$_2$)$_7$CH$_2$CH=CH$_2$. The reaction conversion was 30.8%, and the selectivity was 92.4%.

EXAMPLES 10B to 13B

The same procedure as in Example 9B was repeated, except that the reaction conditions were varied as shown in the following Table 2. The results are shown in Table 2.

TABLE 2

|  | Example 10B | Example 11B | Example 12B | Example 13B |
|---|---|---|---|---|
| Reaction Temp (°C.) | 450 | 450 | 450 | 450 |
| Residence time (sec) | 45 | 80 | 100 | 120 |
| Conversion (%) | 27.2 | 36.9 | 47.3 | 62.7 |
| Selectivity (%) | 92.1 | 93.9 | 95.5 | 93.3 |

EXAMPLE 14B 32.7 g (0.23 mol) of diphosphorus pentaoxide and 330 g (0.69 mol) of $CF_3(CF_2)_7CH_2CH_2CH_2OH$ were charged into a 300 ml three-forked flask equipped with a thermometer, a T-letter type tube and a Liebig cooling tube for distillation, and were stirred at 150° C. for 1 hour to completely react the reactants. A part of the reaction liquor was analyzed by $^{31}P$-NMR and was observed to have two signals derived from $CF_3(CF_2)_7CH_2CH_2CH_2OPO(OH)_2$ and $(CF_3(CF_2)_7CH_2CH_2CH_2O)_2PO(OH)$.

$^{31}P$-NMR($CD_3OD+CF_3CF_2CH_2OH, H_3PO_4$) σ(ppm): −0.8, 1.3.

This reaction product was further heated at 260° to 280°C., and 296 g of a fraction at about 170° C. was recovered as a product. According to gas chromatography analysis, the product thus obtained was recognized to contain 85.9% of $CF_3(CF_2)_7CH_2CH=CH_2$, 3.2% of $CF_3(CF_2)_7CH=CHCH_3$, 6.3% of $(CF_3(CF_2)_7CH_2CH_2CH_2)_2O$ and 3.0% of $CF_3(CF_2)_7CH_2CH_2CH_2OH$.

EXAMPLE 15B 100 g of compound (11B) and 2 μl of a 1% isopropanol solution of chloroplatinic acid were charged into a 200 cc four-forked flask equipped with a stirrer and a thermometer. After raising a temperature to 80° C., 260 g of $CF_3(CF_2)_7CH_2CH=CH_2$ prepared in Example 9B was dropwise added thereto. As the reaction proceeded, an internal temperature rise of about 10° C. was observed. After 4 hours, disappearance of monomer was recognized, and the reaction was stopped. 0.5 g of activated carbon was added thereto and the reaction mixture was stirred at room temperature for 1 hour, followed by filtration to obtain a transparent oil. The product thus obtained was recognized by NMR and IR analysis to have a structure of the formula (12B), and its viscosity was 150 cp.

IR: 1255 $cm^{-1}$(Si—$CH_3$), 1110–1000 $cm^{-1}$(Si—O), 1100–1340 $cm^{-1}$(C—F).

$^1$HNMR σ(ppm): 0.4–0.7(m,Si—$CH_2$—C), 1.7–2.7(m, Si—C—$CH_2CH_2$—).

$(CH_3)_3SiO.[SiH(CH_3)O]_{20}.[Si(CH_3)_2O]_{30}.Si(CH_3)_3$ (11B)

$(CH_3)_3SiO.\{Si[CH_2CH_2CH_2(CF_2)_7CF_3](CH_3)O\}_{20}.[Si(CH_3)_2O]_{30}.Si(CH_3)_3$ (12B)

EXAMPLE 16B

Reaction was conducted under the same reaction conditions as in Example 14B, except that 193 g of $CF_3(CF_2)_7CH_2CH=CH_2$ obtained in Example 14B and 100 g of compound (11B) of Example 15B were used. The product thus obtained was recognized by NMR and IR analysis to have a structure of the formula (13B).

$(CH_3)_3SiO.\{Si(CH_3)[CH_2CH_2CH_2(CF_2)_7CF_3]O\}_{16}.[SiH(CH_3)O]_4.[Si(CH_3)_2O]_{30}.Si(CH_3)_3$ (13B)

EXAMPLE 17B 100 g of compound (11B) of Example 15B and 2 μl of a 1% isopropanol solution of chloroplatinic acid were charged into a 200 cc four-forked flask equipped with a stirrer and a thermometer. After raising a temperature to 80° C., 128 g of $CF_3(CF_2)_7CH_2CH=CH_2$ prepared in Example 9 was dropwise added thereto. Thereafter, 1 g of acetylene was blown thereinto. As the reaction proceeded, an internal temperature rise of about 10° C. was observed. After 4 hours, disappearance of monomer was recognized, and the reaction was stopped. 0.5 g of activated carbon was added thereto, and the reaction mixture was stirred at room temperature for 1 hour, followed by filtration to obtain a transparent oil. The product thus obtained was recognized by NMR and IR analysis to have a structure of the formula (14B), and its viscosity was 160 cp.

$(CH_3)_3SiO.\{Si(CH_3)[CH_2CH_2CH_2(CF_2)_7CF_3]O\}_{10}.[Si(CH_3)(CH=CH_2)O]_{10}.[Si(CH_3)_2O]_{30}.Si(CH_3)_3$ (14B)

As mentioned above, the present invention provides a method for efficiently producing a fluorine-containing silicone compound at a high yield from a compound (I) efficiently producible from a cheap starting material.

This method is a useful method conducted on an industrial scale without using a special reagent or an expensive reagent.

Also, according to the method of the present invention, reaction easily proceeds at a high yield even when the carbon number of a $R^f$ group is large. Also, the method of the present invention has an advantage that fluorine-containing silicone compounds having different structures and different functions can be obtained simply by varying the ratios of starting materials used. The fluorine-containing silicone compounds thus obtained are useful for various uses including stain proofing oils for heat fixing rolls or the like.

What is claimed is:

1. A method for preparing a fluorine-containing unsaturated compound of the formula (I), which comprises reacting a compound of the formula (1A) with a compound (2A) to obtain a compound (3A) and eliminating XY from the compound (3A), as illustrated in the following reaction formula, $R^f$—Q—X  (1A)

+

$CR^1R^2=CR^3CR^4R^5Y$  (2A)

↓

$R^f$—Q—$CR^1R^2CR^3XCR^4R^5Y$  (3A)

↓

$R^f$—Q—$CR^1R^2CR^3=CR^4R^5$  (I)

wherein $R^f$ is a monovalent fluorine-containing organic group, Q is a single bond or a bivalent organic group containing no fluorine atom, each of $R^1$ to $R^5$ is independently a hydrogen atom or a monovalent organic group, X is an iodine atom, a bromine atom or a chlorine atom, and Y is a monovalent group to be eliminated.

2. The method according to claim 1, wherein X is an iodine atom.

3. The method according to claim 1, wherein Y is a halogen atom, —$OCOR^6$ ($R^6$ is a monovalent organic group), —$OR^7$ ($R^7$ is a monovalent organic group), or —OH.

4. The method according to claim 1, wherein at least one of $R^1$ to $R^5$ is a hydrogen atom.

5. The method according to claim 1, wherein all of $R^1$ to $R^5$ are hydrogen atoms.

6. The method according to claim 1, wherein the compound of the formula (1A) and the compound of the formula (2A) are reacted in the presence of a radical.

7. The method according to claim 6, wherein the radical is a radical derived from azobisisobutyronitrile.

8. The method according to claim 1, wherein the elimination of XY from the compound of the formula (3A) is carried out in the presence of zinc.

9. A method for preparing a fluorine-containing unsaturated compound of the following formula (II), which comprises reacting a fluorine-containing hydroxyl compound of the following formula (1B) with at least one compound selected from the group consisting of a carboxylic acid derivative of the following formula (2B), a phosphoric acid derivative of the following formula (3B), diphosphorous pentaoxide, metaphosphoric acid, pyrophosphoric acid and polyphosphoric acid, and further subjecting to pyrolysis, $$R^f\text{—Q—}CH_2CH_2CH_2OH \quad (1B)$$

$$R^{1B}COX^{1B} \quad (2B)$$

$$(X^{2B})(X^{3B})(X^{4B})PO \quad (3B)$$

$$R^f\text{—Q—}CH_2CH=CH_2 \quad (II)$$

wherein $R^f$ is a monovalent fluorine-containing organic group, Q is a single bond or a bivalent organic group containing no fluorine atom, $R^{1B}$ is a hydrogen atom or a $C_1$–$C_4$ alkyl group, $X^{1B}$ is a halogen atom, —$OR^{6B}$ or —$OCOR^{7B}$ (wherein $R^{6B}$ is a hydrogen atom or a $C_1$–$C_4$ alkyl group and $R^{7B}$ is a $C_1$–$C_4$ alkyl group), and each of $X^{2B}$, $X^{3B}$ and $X^{4B}$ may be the same or different, and is a halogen atom or —$OR^{8B}$ (wherein $R^{8B}$ is a hydrogen atom or a $C_1$–$C_4$ alkyl group).

10. The method according to claim 9, wherein $R^f$ is a $C_1$–$C_{20}$ polyfluoroalkyl group.

11. The method according to claim 9, wherein $R^f$ is a $C_1$–$C_{20}$ perfluoroalkyl group.

12. The method according to claim 9, wherein Q is a single bond.

13. The method according to claim 9, wherein $R^{1B}$ is a methyl group.

14. The method according to claim 9, wherein the reaction is carried out in the presence of an acid catalyst.

15. The method according to claim 9, wherein the pyrolysis is carried out in a gas phase reaction.

16. A method for preparing a fluorine-containing unsaturated compound of the following formula (II), which comprises reacting a fluorine-containing hydroxy compound of the following formula (1B) with a carboxylic acid derivative of the following formula (2B) to obtain a carboxylic acid ester of the following formula (5B), and subjecting the carboxylic acid ester to pyrolysis.

$$R^f\text{—Q—}CH_2CH_2CH_2OH \quad (1B)$$

$$R^{1B}COX^{1B} \quad (2B)$$

$$R^f\text{—Q—}CH_2CH_2CH_2OCOR^{1B} \quad (5B)$$

$$R^f\text{—Q—}CH_2CH=CH_2 \quad (II)$$

wherein $R^f$ is a monovalent fluorine-containing organic group, Q is a single bond or a bivalent organic group containing no fluorine atom, $R^{1B}$ is a hydrogen atom or a $C_1$–$C_4$ alkyl group, and $X^{1B}$ is a halogen atom, —$OR^{6B}$ or —$OCOR^{7B}$ (wherein $R^{6B}$ is a hydrogen atom or a $C_1$–$C_4$ alkyl group and $R^{7B}$ is a $C_1$–$C_4$ alkyl group).

17. The method according to claim 16, wherein $R^f$ is a $C_1$–$C_{20}$ polyfluoroalkyl group.

18. The method according to claim 16, wherein Q is a single bond.

19. The method according to claim 16, wherein $R^{1B}$ is a methyl group.

20. The method according to claim 16, wherein the carboxylic acid derivative of the formula (2B) is acetic acid, acetic acid chloride or acetic anhydride.

* * * * *